E. W. SHOWALTER.
ACETYLENE GAS GENERATOR.
APPLICATION FILED JULY 16, 1912.
1,090,759.
Patented Mar. 17, 1914.
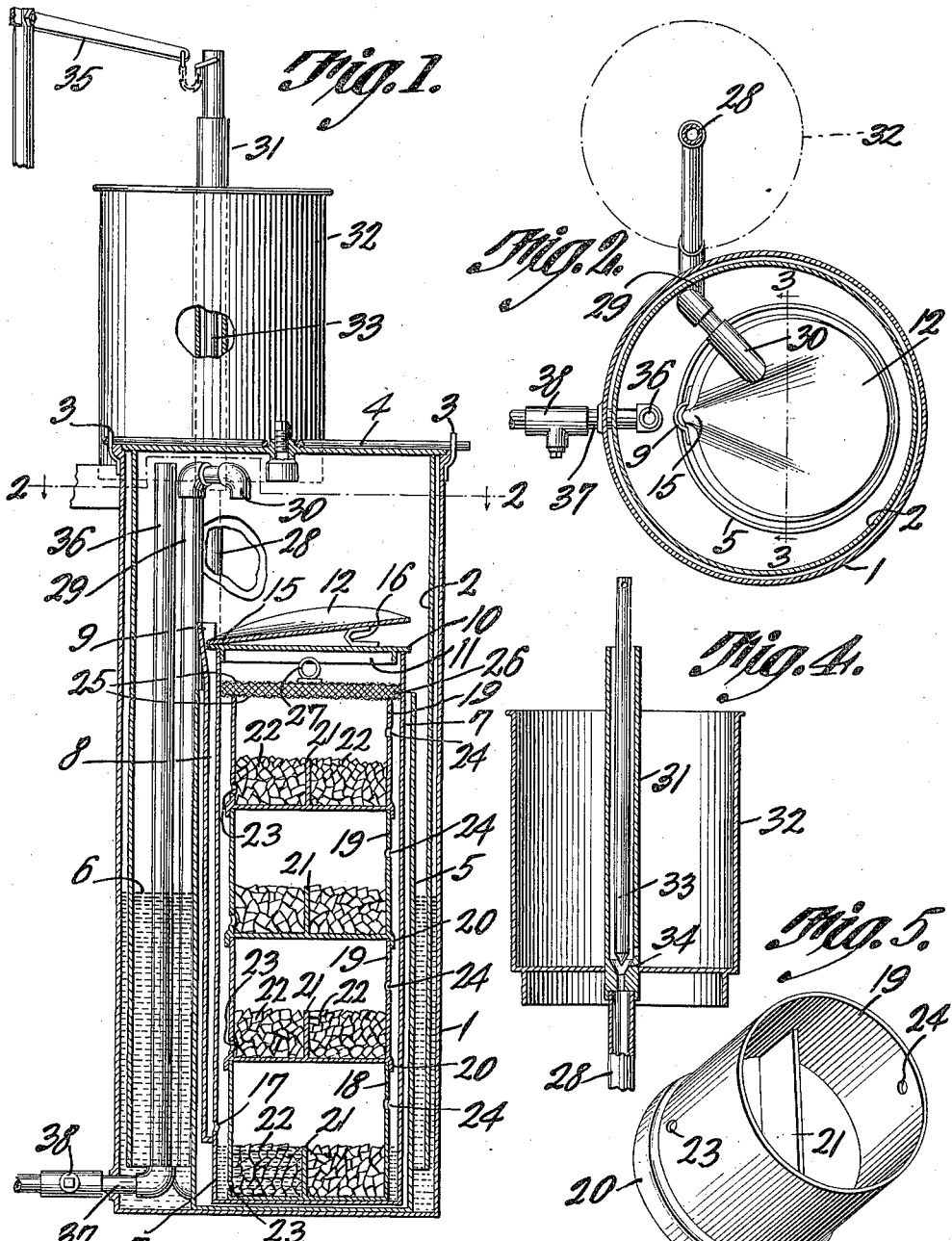
Witnesses
Erasmus W. Showalter Inventor
by Cashow & Co.
Attorneys

UNITED STATES PATENT OFFICE.

ERASMUS W. SHOWALTER, OF CLAYPOOL, INDIANA.

ACETYLENE-GAS GENERATOR.

1,090,759.　　　　　Specification of Letters Patent.　Patented Mar. 17, 1914.

Application filed July 16, 1912. Serial No. 709,789.

*To all whom it may concern:*

Be it known that I, ERASMUS W. SHOWALTER, a citizen of the United States, residing at Claypool, in the county of Kosciusko and State of Indiana, have invented a new and useful Acetylene-Gas Generator, of which the following is a specification.

The device forming the subject matter of this application is a generator, adapted to produce gas by the action of water upon calcium carbid.

One object of the present invention is to provide novel means for delivering water into a container which holds the carbid pans.

Another object of the invention is to improve the filter construction.

The invention aims to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows in vertical longitudinal section, a gas generator constructed in accordance with the present invention, parts being broken away and sectioned; Fig. 2 is a transverse section on the line 2—2 of Fig. 1; Fig. 3 is a transverse section of the deflector and adjacent parts, the cutting plane being passed along the line 3—3 of Fig. 2; Fig. 4 is a vertical longitudinal section of the water tank and adjacent parts; and Fig. 5 is a perspective view showing one of the carbid pans.

In carrying out the present invention there is provided a generator which is a composite structure, the same comprising a jacket 1, open at the top, and a drum 2, open at the bottom, the drum fitting within the jacket 1 as will be understood best from Fig. 1, the lower end of the drum 2 being spaced from the bottom of the jacket 1 and the upper end of the drum resting upon the upper end of the jacket. At its upper end, the jacket 1 is provided with perforated ears 3 through which extends a rod 4, engaging the upper end of the drum 2 and constituting means for holding the drum in place in the jacket.

Located within the contour of the drum 2 and resting upon the bottom of the jacket 1 is a tubular casing 5, open at its upper end. A water seal 6 extends between the casing 5 and the jacket 1, and into the water seal the lower end of the drum 2 dips. Disposed within the casing 5 and resting upon the bottom of the casing is a tubular container 7 which is open at its upper end. The upper end of the container 7 extends above the upper end of the casing 5. Secured to the wall of the container 7 is a tube 8, provided at its upper end with a flared inlet 9 which extends above the upper end of the container. Resting upon the upper end of the container 7 is a movable lid 10 provided with a depending flange 11 which fits loosely within the perimeter of the container 7.

Mounted upon the lid 10 is a deflector 12. As shown most clearly in Fig. 2, the deflector 12 preferably is of circular outline. Referring to Fig. 3 it will be observed that the deflector 12, as shown at 14, is concaved, so that the deflector, in substance, is of trough-shape. One end of the trough thus formed is decreased in width to form a spout 15 and this spout discharges into the flared inlet portion 9 of the tube 8. The deflector 14 is secured directly to the lid 10, and with this end in view, a supporting bracket 16 unites the deflector with the lid, the deflector being inclined. Water is discharged upon the deflector by a means to be set forth hereinafter, and the water following the inclination of the deflector, will pass through the contracted spout 15 and enter the tube 8 by way of the flared inlet 9. In the wall of the container 7 there is an opening 17 establishing a communication between the interior of the tube 8 and the interior of the container.

Mounted in superposed relation within the container 7 is a plurality of carbid pans 18 and 19, the numeral 18 indicating the lowermost pan and the numeral 19 indicating the upper pans. The only difference between the pans 18 and 19 is that the pans 19 are provided at their lower ends with flanges 20 adapted to surround the next lower pan, the pan 18 being devoid of such a flange. Extended transversely of each carbid pan 18—19 is a partition 21, dividing the interior of the pan into two compartments. The partition 21 is of less height than the side wall of the pan. The carbid which is lodged in each compartment is denoted by the numeral 22. In the side wall of each pan there is a water inlet 23, opening into one compartment and disposed adjacent the bottom of the pan. In the side wall of each pan there is a gas outlet 24 spaced at some distance from the bottom of the pan, the outlet 24 being located above the outer edge of the partition 21.

Supported upon the upper end of the uppermost carbid pan 19 and spaced from the lid 10 is a filter, the same in the present instance comprising two layers 25 of wire netting or other foraminous material, there being a pad 26, of felt or the like, disposed between the layers 25. The pad above described not only serves as a closure for the upper end of the uppermost carbid pan 19 but, as well, bridges the space between the wall of the uppermost pan and the wall of the container 7. The filter is provided with a suitable handle 27, to facilitate the removal of the same.

Disposed upon the outside of the generator (comprising the jacket 1 and the drum 2) is an upright pipe 28 having a branch 29 which extends upwardly within the generator, to a point adjacent the top thereof, the branch 29 terminating in a nozzle 30 which discharges upon the concaved, inclined deflector 12. The upper end of the pipe 28 supports a valve casing 31, the valve casing in turn supporting a water tank 32. Mounted to move in the valve casing 31 is a needle valve 33 adapted to coöperate with a seat 34 in the valve casing 31. Any suitable means indicated at 35 may be provided for operating the valve 33.

An upright gas outlet pipe 36 is located within the generator 1—2, the upper, open end of the outlet pipe being disposed close to the top of the generator. The lower end of the gas outlet pipe 36 passes outwardly through the side wall of the jacket portion 1 of the generator, as shown at 37, and in the portion 37 of the gas outlet pipe may be placed a valve 38.

In practical operation, by operating the valve controlling means 35, the valve 33 will be elevated off the seat 34, and then water will pass from the tank 32 into the pipe 28, into the branch 29 of the pipe, and will flow by way of the nozzle 30 on to the deflector 12. From the deflector 12, the water will be directed into the flared portion 9 of the tube 8, the water traversing the tube 8 and passing by way of the opening 17 into the interior of the container 7. Thence, the water will pass through the opening 23 into the lowermost carbid pan 18 and flood one compartment thereof. As the water rises in the pan 18, the water will overflow the upper edge of the partition 21 and ultimately will saturate the carbid in the other compartment of the pan. When the water has risen sufficiently, both compartments of the lowermost pan will be flooded, the gas passing outwardly through the outlet 24 until the outlet is cut off by the rising water. One pan after another may be flooded in this manner. The gas generated in any carbid pan will pass outwardly through the opening 24 and rise between the pans and the container 7. This rising body of gas will pass through that portion of the filter 25—26 which lies between the perimeter of the uppermost pan 19 and the perimeter of the container 7. The gas generated in the uppermost carbid pan 19 will pass directly upwardly through the filter 25—26.

The gas accumulates above the filter 25—26 and may raise the lid 10, the gas flowing thence into the interior of the generator proper 1—2, and passing out of the generator by way of the pipe 36—37. The tank 32 affords sufficient head so that the back pressure caused by the lid 10 will not interfere with the operation of the device.

The container 7 may be removed readily, carrying with it the tube 8. Further, the lid 10 may be removed, carrying the deflector 12. In this manner, those portions of the device which conduct the water into the interior of the container 7 may be removed easily for cleaning. By adjusting the lid 10 circumferentially on the container 7, the outlet spout 15 of the deflector may be brought into registration of the flared end 9 of the tube 8.

Having thus described the invention, what is claimed is:—

1. In a device of the class described, a generator; an outlet therefor; a container within the generator; a closure for the container; a water conduit communicating with the interior of the container; an inclined deflector supported solely by the closure and discharging into the conduit, the closure being movable upon the container to aline the discharge end of the deflector with the intake end of the conduit; and a source of water supply discharging on the deflector.

2. In a device of the class described, a generator; an outlet therefor; a removable container in the generator; a water conduit secured to one side of the container and opening adjacent its lower end into the container, the upper end of the conduit being extended above the upper end of the container; a movable closure resting on the upper end of the container; an inclined deflector supported solely by the closure and discharging into the upper end of the conduit; and means for discharging water upon the deflector.

3. In a device of the class described, a generator having an outlet; a container in the generator; means for discharging water into the container; superposed carbid pans in the container and having openings in their side walls; a filter resting directly upon the top of the uppermost pan and engaging the container to effect a filtering of the gas rising between the pans and the container, and to effect a filtering of the gas rising from the uppermost pan; and a closure resting on the upper end of the container and spaced from the filter.

In testimony that I claim the foregoing as my own, I have hereto affixed my signature in the presence of two witnesses.

ERASMUS W. SHOWALTER.

Witnesses:
CARL C. CLUEN,
LEWIS DEBOLB.